US 8,171,251 B2

(12) United States Patent
Ziv et al.

(10) Patent No.: US 8,171,251 B2
(45) Date of Patent: May 1, 2012

(54) DATA STORAGE MANAGEMENT METHOD AND DEVICE

(75) Inventors: Aran Ziv, Natanya (IL); Eyal Bychkov, Hod Hasharon (IL); Aryeh Mergi, Hod Hasharon (IL); Itzhak Pomerantz, Kefar Saba (IL)

(73) Assignee: Sandisk IL Ltd., Kfar Saba (IL)

( * ) Notice: Subject to any disclaimer, the term of this patent is extended or adjusted under 35 U.S.C. 154(b) by 372 days.

(21) Appl. No.: 11/655,866

(22) Filed: Jan. 22, 2007

(65) Prior Publication Data

US 2007/0220220 A1 Sep. 20, 2007

Related U.S. Application Data

(60) Provisional application No. 60/782,839, filed on Mar. 16, 2006.

(51) Int. Cl.
*G06F 12/00* (2006.01)
(52) U.S. Cl. ........................................ 711/171; 455/558
(58) Field of Classification Search .................. 711/171; 455/558
See application file for complete search history.

(56) References Cited

U.S. PATENT DOCUMENTS

| | | | | |
|---|---|---|---|---|
| 4,873,662 A * | 10/1989 | Sargent | ......................... | 711/200 |
| 6,269,382 B1 * | 7/2001 | Cabrera et al. | ................ | 707/204 |
| 6,615,225 B1 * | 9/2003 | Cannon et al. | ................ | 707/204 |
| 7,190,284 B1 * | 3/2007 | Dye et al. | ......................... | 341/51 |
| 7,330,997 B1 * | 2/2008 | Odom | ............................... | 714/6 |
| 2001/0052038 A1 * | 12/2001 | Fallon et al. | .................... | 710/68 |
| 2001/0054131 A1 * | 12/2001 | Alvarez et al. | ................ | 711/105 |
| 2002/0073172 A1 * | 6/2002 | Armstrong et al. | ........... | 709/219 |
| 2003/0061352 A1 * | 3/2003 | Bohrer et al. | ................ | 709/226 |
| 2004/0039876 A1 * | 2/2004 | Nelson et al. | ................ | 711/115 |
| 2004/0054656 A1 * | 3/2004 | Leung et al. | ...................... | 707/1 |
| 2004/0235523 A1 * | 11/2004 | Schrire et al. | ................ | 455/558 |
| 2005/0055512 A1 * | 3/2005 | Kishi | ............................ | 711/135 |
| 2005/0071708 A1 * | 3/2005 | Bartfai et al. | ..................... | 714/5 |
| 2005/0102329 A1 * | 5/2005 | Jiang et al. | ..................... | 707/204 |
| 2005/0165796 A1 | 7/2005 | Moore | | |
| 2006/0059324 A1 * | 3/2006 | Simske et al. | ................ | 711/170 |
| 2007/0077915 A1 * | 4/2007 | Black et al. | .................... | 455/411 |

FOREIGN PATENT DOCUMENTS

| | | |
|---|---|---|
| EP | 1182554 A2 | 2/2002 |
| WO | 2005050381 A2 | 6/2005 |
| WO | 2005081942 A2 | 9/2005 |
| WO | 2006011139 A2 | 2/2006 |

OTHER PUBLICATIONS

Welch, T.A., "A Technique for High-Performance Data Compression" Computer, Jun. 1984, vol. 17, pp. 8-19.
Ashton LL et al. "Two Decades of Policy-Based Storage management for the IBM Mainframe Computer" IBM Systems Journal, IBM Corp. Armonk, New York U.S. vol. 42 No. 2 2003 pp. 302-321.
International Search Report and Written Opinion of International Application No. PCT/IL2007/000291, dated May 25, 2007, 12 pages.

* cited by examiner

*Primary Examiner* — Hashem Farrokh
(74) *Attorney, Agent, or Firm* — Toler Law Group, PC

(57) ABSTRACT

A storage device includes a local memory, wherein data are locally stored, and a controller that is operative, in accordance with a reduction policy, to modify the data on the local memory, thereby freeing storage area on the local memory.

8 Claims, 2 Drawing Sheets

DATA STORAGE MANAGEMENT METHOD AND DEVICE

CROSS-REFERENCE TO RELATED APPLICATIONS

This patent application claims the benefit of U.S. Provisional Application No. 60/782,839 filed Mar. 16, 2006.

FIELD OF THE INVENTION

The present invention relates generally to the field of personal data storage. More particularly, the present invention relates to storage management of data files among storage devices.

BACKGROUND OF THE INVENTION

Synchronization of stored data between related storage locations is well known in the art of digital computing. Synchronization of data is a process of transferring data from a first storage device to a second storage device, in an attempt to ensure that all the storage devices store the same data. The synchronization process typically is applied when the data is not stored at all in the second storage device or if the data stored in the second storage device is not as up to date as the data stored in the first storage device.

Many conventional personal computers known in the art synchronize their hard-disk content to a remote back-up server. Computers that are connected to networks are programmed to synchronize the local content with the network. However, both types of synchronization are not designed for economy of the consumed storage area and do not employ user-oriented rules for freeing storage area on the limited storage device.

Many types of mobile phones known in the art are implemented with a memory card (e.g. SIM card) to communicate with a backup application and synchronize the content on the memory with the information stored in a user's computer. However, this type of synchronization is also not designed for economy of the storage space consumed on the mobile phone and does not employ techniques intended to release storage space on the mobile phone.

Several types of cameras having a memory card upload images stored in the memory card to a host computer, leaving only thumbnails of the original images on the memory card for reference purposes. However, this type of synchronization does not apply automatic decision making regarding which content is to be backed up.

A prior art synchronization method is taught in International Application Publication No. WO2006011139 to Kedem.

The Kedem application discloses a method of managing local and remote data storage. The method includes displaying file names as single logical volumes, each logical volume referencing both the local data files and the remote data files. The user individually assigns a location attribute to each selected file name. According to the Kedem application, assigning a location attribute on the remote data storage only instructs the system to delete the local data file, whereas assigning a location attribute on the local data storage only instructs the system to delete the remote data. Assigning a location attribute on both the local data storage and the remote data storage synchronizes these files.

However, the Kedem invention applies a pre-determined synchronization technique that does not take into consideration the probability of use of the data.

It can be seen that the prior art, including the Kedem invention, fail to apply a general policy for automatically optimizing the consumption of the local storage area, so that the availability of data on the local storage area corresponds with the changing need of its use.

Thus, it would be highly desirable to provide such a method achieving optimal reduction of the consumed and limited storage area of the storage device.

SUMMARY OF THE INVENTION

Accordingly, it is a principal object of the present invention to introduce a storage device and method for maximizing available storage area on a local device having limited storage capacity, such as a mobile phone.

Data files stored in the local storage area modified automatically, in accordance with a set of predetermined rules for reversibly reducing the volume of data locally stored on the local storage area. This set of rules (herein "reduction policy") determines which part of the data stored in the local storage area is to be modified, when the data is to be modified and how the modifying procedure is to be performed.

The modification of the locally stored data may be further contingent on values of different parameters, such as usage history, time, date, size of the designated data, expected use of the designated data, location of the remote device, etc.

In accordance with a preferred embodiment, there is provided a storage device that includes: (a) a local memory, wherein data are locally stored; and (b) a controller that is operative, in accordance with a reduction policy, to modify the data on the local memory, thereby freeing storage area on the local memory.

Preferably, the reduction policy is effected in accordance with a value of at least one member of a set of parameters, such as usage history of this portion of data, time, date, size of this portion of data, location of a remote memory, time and date when a user is likely to use this portion of data, etc.

Preferably, the controller is also operative to restore the data on the local memory.

Preferably, the modification is effected by transferring at least a portion of the data from the local memory to a remote memory physically separated from the storage device.

Preferably, the modification is effected by lossless compression. Alternatively, the modification is effected by lossy compression.

Preferably, the modification is effected by keeping a symbolic representation of the data on the local memory. By "symbolic representation" is defined herein to any feature, such as an icon, that represents the data.

Preferably, the modification is effected by keeping only a beginning of the data on the local memory.

In accordance with a preferred embodiment, there is also provided a method of managing data storage of a storage device that includes a local memory and a controller, the method includes the steps of: (a) storing data, in the local memory; and (b) in accordance with a reduction policy applied by the controller, modifying the data on the local memory, thereby freeing storage area on the local memory.

Preferably, the reduction policy is effected in accordance with a value of at least one member of a set of parameters, such as usage history of this portion of data, time, date, size of this portion of data, location of a remote memory, time and date when a user is likely to use this portion of data, etc.

Preferably, the method also includes the step of restoring the data on the local memory.

Preferably, the modifying is effected by transferring at least a portion of the data from the local memory to a remote memory physically separated from the storage device.

Preferably, the modifying is effected by lossless compression. Alternatively, the modifying is effected by lossy compression.

Preferably, the modifying is effected by keeping a symbolic representation of the data on the local memory.

Preferably, the modifying is effected by keeping only a beginning of the data on the local memory.

Additional features and advantages of the invention will become apparent from the following drawings and description.

BRIEF DESCRIPTION OF THE DRAWINGS

For a better understanding of the invention with regard to the embodiments thereof, reference is made to the accompanying drawing, in which like numerals designate corresponding sections or elements throughout, and in which.

DETAILED DESCRIPTION OF THE PREFERRED EMBODIMENTS

Figure 1:
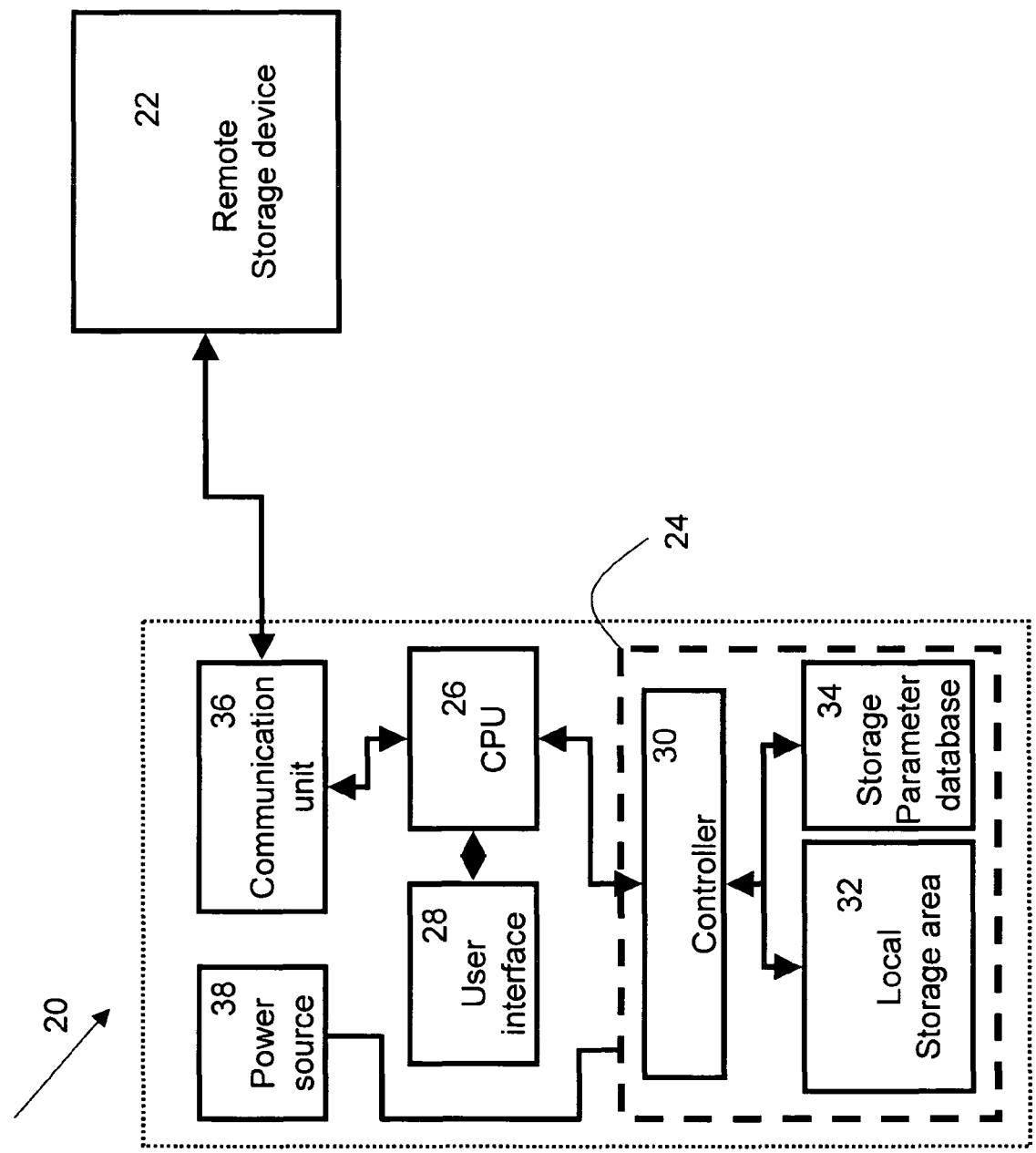
FIG. 1 is a high-level block diagram of a storage device of the present invention.

The present invention is a storage device and method for maximizing available storage area on a local device having limited storage capacity, such as a mobile phone.

Data files (or a portion thereof) stored in the local storage area are identified, copied to the storage area of the remote device and then modified locally on the local storage area. The modification of the locally stored data is applied automatically, in accordance with the values of the reduction policy. The modification of the locally stored data is typically applied by transferring (or totally erasing) a portion of the data to a remote storage and keeping only a portion or representations of the data on the local storage area. Then, upon request, the modified data on the local storage area are restored by bringing this data up to date with the data on the remote device.

Such modification procedure ensures that only a limited amount of data (that is most-required by a user, for example) is stored in the local storage area, whereas a larger amount of data (of less importance for example) is stored in a remote storage area.

The modification procedure is optionally contingent on values of different parameters, such as usage history, time, date, size of the designated data, expected use of the designated data, location of the remote device, etc.

The representations of the data include any information that enable to fetch or to at least partly restore the synchronized data from the storage area of the remote device to the local device. Typically, the representative of a data file can be a compressed version (lossy or lossless) of the data file, an icon, the beginning of the data file, etc.

Examples of such modifying procedures are as follows:

1. A Loss-less data compression. This method is a reversible data compression procedure known in the art, such as the Run-Length Encoding (RLE) or the Lempel-Ziv Compression. See for example, Welch, T. A., *A technique for high-performance data compression*, Computer, June 1984, Vol. 17, pp. 8-19, which is incorporated by reference for all purposes as if fully set forth herein. Such compression procedures are typically applied to textual information that cannot tolerate errors, since data that is compressed in this way can be later restored without loss of information.

2. A Lossy data compression. This method is a partially reversible data compression procedure known in the art, such as a conversion of a bitmap image into a JPEG image, which enables to restore data without a need to contact a remote storage device but with a lower resolution than the original data. Such compression procedure is typically used when a quick restoration procedure of the compressed image is required but not particularly to be displayed in high resolution. Photographs are a typical example of files that can be compressed in this mode. Clearly, while the partial, low resolution, image is provided and displayed, the storage device can retrieve a higher resolution version of the original image from the remote storage device, and upon the arrival of the higher resolution version replace the low resolution image with the higher resolution version.

3. An Icon representation. This method is an irreversible compression procedure, by which the data is erased from the local storage area after being sent to the remote storage device to be represented in the local storage area by an icon only. Requesting a file via its icon instructs the storage device to retrieve the full content of this file from the remote storage device. Since the process of retrieving the full content from the remote storage device consumes time and is dependent upon availability of communication between the storage device and the remote storage device, such compression procedure is typically useful in cases that tolerate the existence of a short delay before the information is retrieved.

4. A Beginning of a file storage method. This method is a compression procedure known in the art, typically applied for storing sequentially played content, such as songs, recited stories, movies, etc. According to such compression procedure, a first portion of the file (e.g., the beginning of the file including an initial bit of the file) is stored in the local storage area, whereas the remaining data of the file is stored in the remote storage device. As a data retrieval procedure is typically faster than the process of playing the data, streaming mechanisms well known in the art of digital communication can be used for bridging the initial time (that is typically long and noticed by the user) required for retrieving the file from the remote storage device by meanwhile playing the first portion of the file.

5. An Interruption representation. This method is a compression procedure for restoring the general state of a file, such as a computer game, based on pre-defined status parameters. According to this compression procedure, it is possible to restore the general state of the file while totally deleting its full content. Optionally, the general state of the file can be stored in the remote storage device as backup in case the full screen is not successfully restored based on the status parameters.

Referring to FIG. 1, there is shown a high level block diagram of a storage device 20 of the present invention, implemented as a mobile phone. Storage device 20, including a CPU 26 and a user interface 28 for receiving data (such as music, digital books, photographs, etc.). Storage device 20 is connected to remote storage device 22 via a communication unit 36 using a cellular network or the Internet, as an example.

A storage unit 24, such as a SIM card, is a detachable, replaceable and transferable storage unit that is dependent upon a power source 38 for operation. Storage unit 24 includes a local storage area 32 operative for storing a limited amount of data (typically the data most often required by a user) and a controller 30.

Controller 30 is operative to download a data file (either a new data file or an updated data file) stored in local storage area 32 to a storage area of remote storage device 22 and to then to compress this data file (of which is stored in the local storage area) and leave only a portion or a representation of this data file on the local storage area.

The download of data as well as the compression of data are both applied automatically, in accordance with respective values of a reduction policy that is stored in Storage Parameter database 34. As illustrated in FIG. 1, the Storage Parameter database 34 is implemented in storage unit 24 as a separate unit. Alternatively, Storage Parameter database 34 is embedded within local storage area 32.

Figure 2:
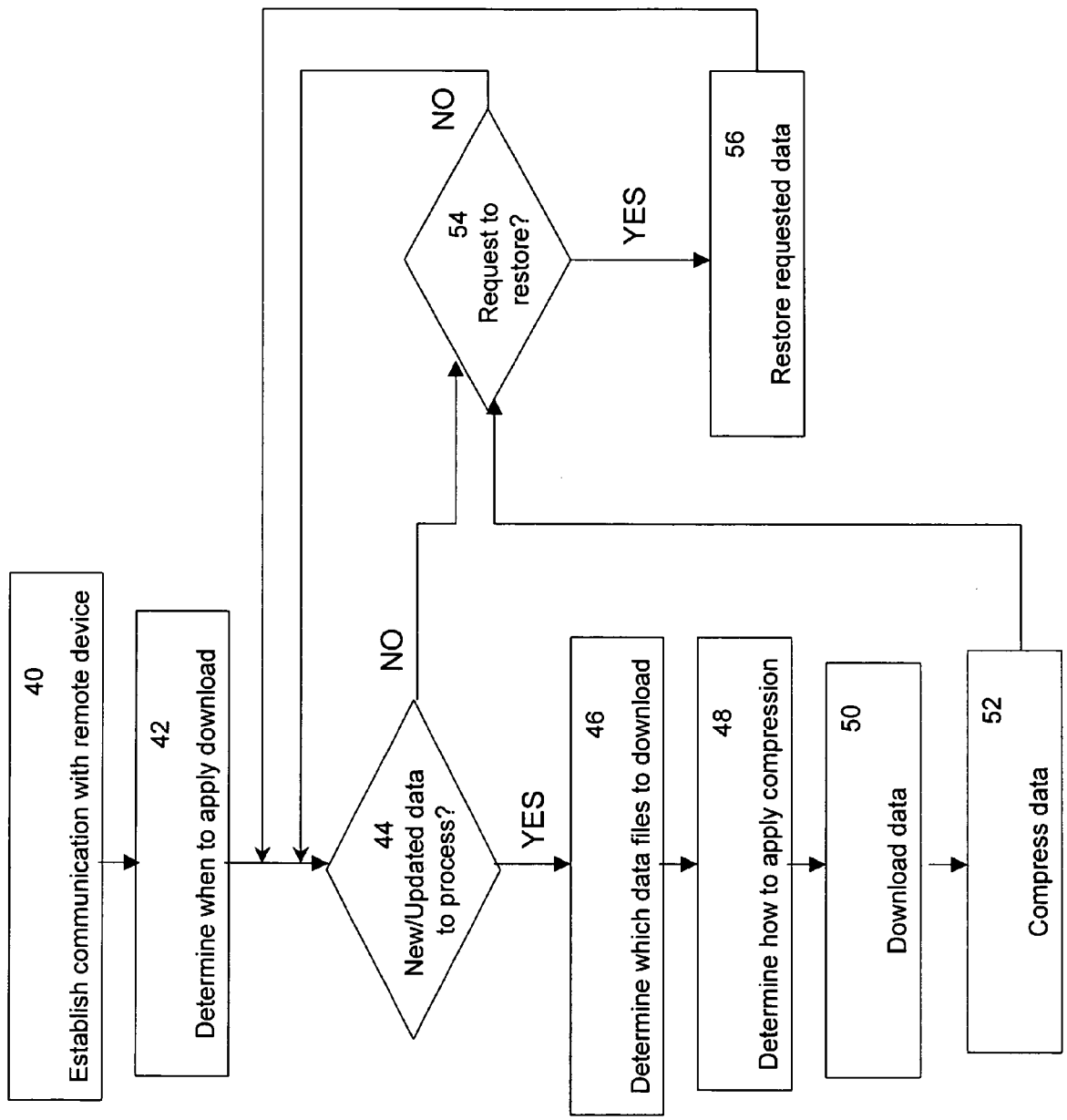
FIG. 2 is a flow chart of a method of the present invention.

Referring now to FIG. 2, there is shown a flow chart of a method of the present invention. At the initial step 40, communication is established, via power source 38 and communication unit 36, between storage device 20 and remote storage device 22 (see FIG. 1) for initiating operation of storage device 20.

At the second step 42, the time at which to apply the automatic download of data from local storage area 32 of storage device 20 to remote storage device 22 is determined. This step is applied in accordance with the values of the parameters stored in Storage Parameter database 34. As an example, it can be determined that the download of data will be carried out at night only or when the battery of storage device 20 is fully loaded. Alternatively, it can be determined that the download of data is contingent on there being too little free storage area in storage device 20.

At step 43, it is determined whether new data files have been created and/or existing data files have been updated in storage device 20 since the last time data was downloaded to remote storage device 22.

In the negative case, the method proceeds directly to step 54.

However in case data files have been created and/or updated, the data files to be downloaded are determined (step 46) in accordance with the values of the parameters stored in Storage Parameter database 34. Typical parameters that affect this determination step include, among others, time since the file was last in use, likelihood of usage, the size of the file, the amount of free storage area that can be saved during the compressing procedure (of step 52), etc.

At step 48, respective compressing parameters, defining the manner (when, how) in which the compressing procedure (of step 52) is to be applied, are defined for each of the data files (of step 46).

At step 50, the data files (previously determined at step 46) are downloaded from local storage area 32 to remote storage area 22.

At the next step 52, each of the downloaded data files is then compressed in local storage are 32 according to respective compressing parameters (previously determined at step 46). The compression procedure is applied to keep only a representation of the downloaded data on the local storage area, as described herein above. Following this step the method proceeds to carry out step 54.

At step 54 it is determined whether a request has been made to restore any data files on local storage area 32. In the affirmative case, step 56, the requested data (as represented on local storage area 32) are synchronized with the data on remote storage area 22 and the requested data files are restored on local storage area 32. However in the negative case, the method returns to step 44 in order to determine whether new data files and/or updated data files are designated to be downloaded and compressed, thereby freeing local storage area on the storage device of the present invention.

Preferably, steps 50 and 52, applying the download and compression of data, are not simultaneously executed for all the data files in storage device 20 that are designated to be downloaded, as this may drain the controller's resources in case the controller is busy with a higher priority task. Therefore, the designated files are sorted for execution in a queue, preferably according to the files' priorities (such as the amount of free storage achieved when compressing a file).

It should be noted that the present invention relates to a storage device implemented as a mobile phone. However, it can be understood that other implementations are possible within the scope of the invention, thus relating to any storage device and method applicable to selectively and automatically synchronize data stored in the local storage area of the storage device with data stored in a remote storage area, in accordance with values of pre-determined parameters.

Having described the invention with regard to certain specific embodiments thereof, it is to be understood that the description is not meant as a limitation, since further modifications will now suggest themselves to those skilled in the art, and it is intended to cover such modifications as fall within the scope of the appended claims.

The invention claimed is:

1. A storage device comprising:
    a storage parameter database storing values of parameters;
    a local storage area storing data files; and
    a controller operative to:
        copy the data files from the local storage area to a remote data storage;
        automatically select a particular modification procedure from a plurality of modification procedures that includes at least three of lossless compression, lossy compression, beginning of file storage, icon representation, and interruption representation, wherein the selection is made based at least in part on the values of the parameters stored in the storage parameter database; and
        after the particular modification procedure is selected, modify the data files stored in the local storage area in accordance with the selected, particular modification procedure to effect a reduction policy that replaces each data file stored in the local storage by a corresponding data file representation.

2. The storage device of claim 1, wherein the parameters include a date when a user is likely to use the data.

3. The storage device of claim 1, wherein prior to the copying and the modifying, the controller is further operative to sort the data files in a queue for sequential execution of the copying and the modifying according to a predetermined priority order.

4. The storage device of claim 1, wherein the local storage area and the controller are included in a subscriber identity module (SIM) card.

5. The storage device of claim 1, wherein the values of the parameters specify a battery condition to be satisfied before the data files are copied.

6. The storage device of claim 1, wherein the values of the parameters specify a time of day to copy the data files.

7. The storage device of claim 1, further comprising a storage region operative to store the storage parameter database, wherein the storage region is distinct from the local storage area.

8. The storage device of claim 1, wherein the controller is operative to automatically copy the data files from the local storage area to the remote data storage.

* * * * *